June 14, 1966  E. MURPHY  3,256,416
RADIO-FREQUENCY DIELECTRIC OVENS
Filed June 6, 1963  4 Sheets-Sheet 1
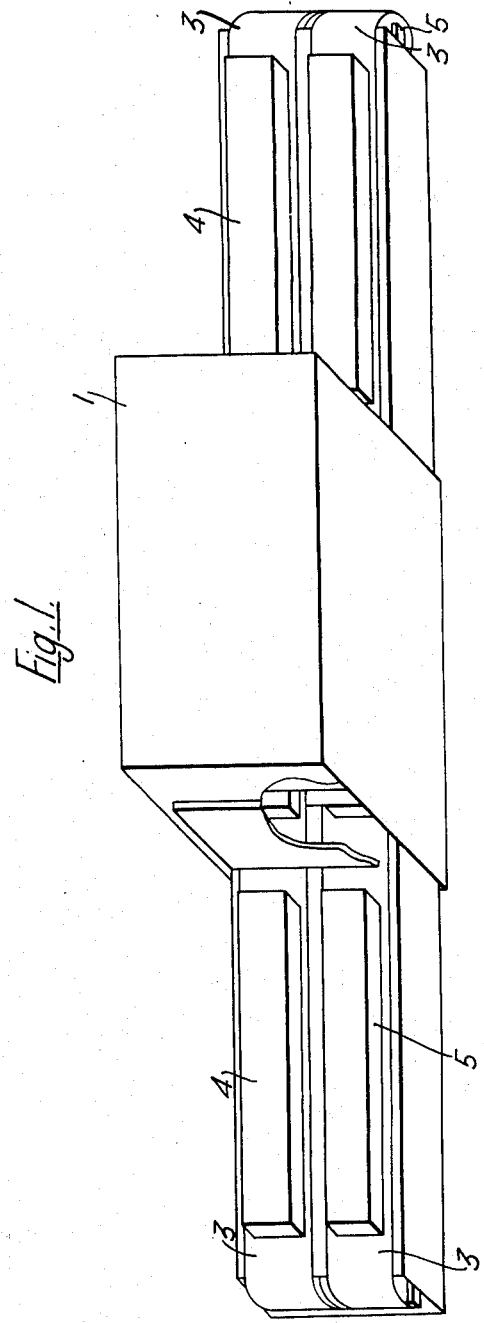
Inventor
Edmund Murphy
By Bailey, Stephenson,
Huettig
Attorneys June 14, 1966  E. MURPHY  3,256,416
RADIO-FREQUENCY DIELECTRIC OVENS
Filed June 6, 1963  4 Sheets-Sheet 2
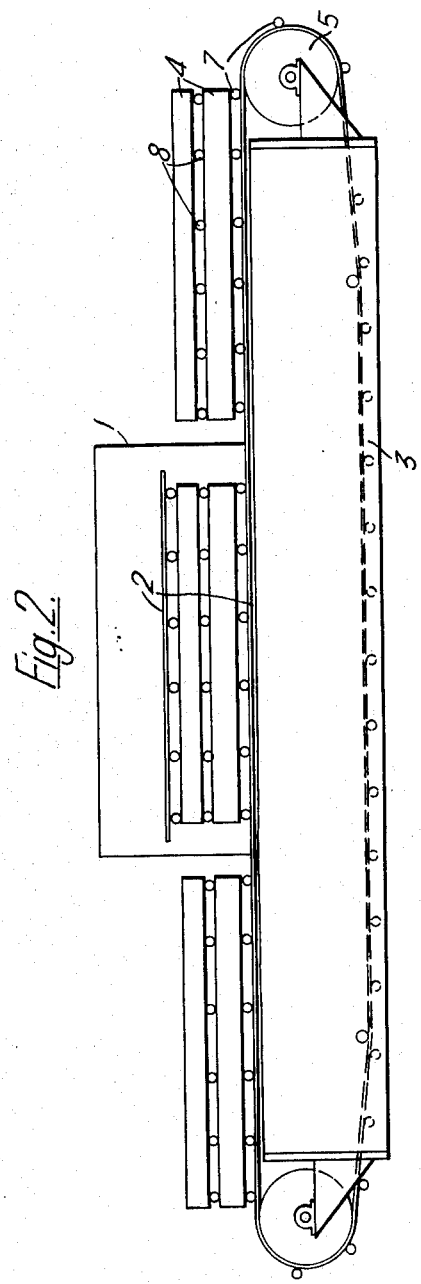
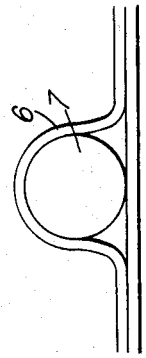
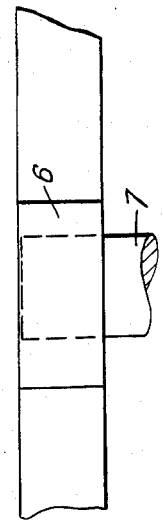
Inventor
Edmund Murphy
By Bailey, Stephens
Huettig
Attorneys

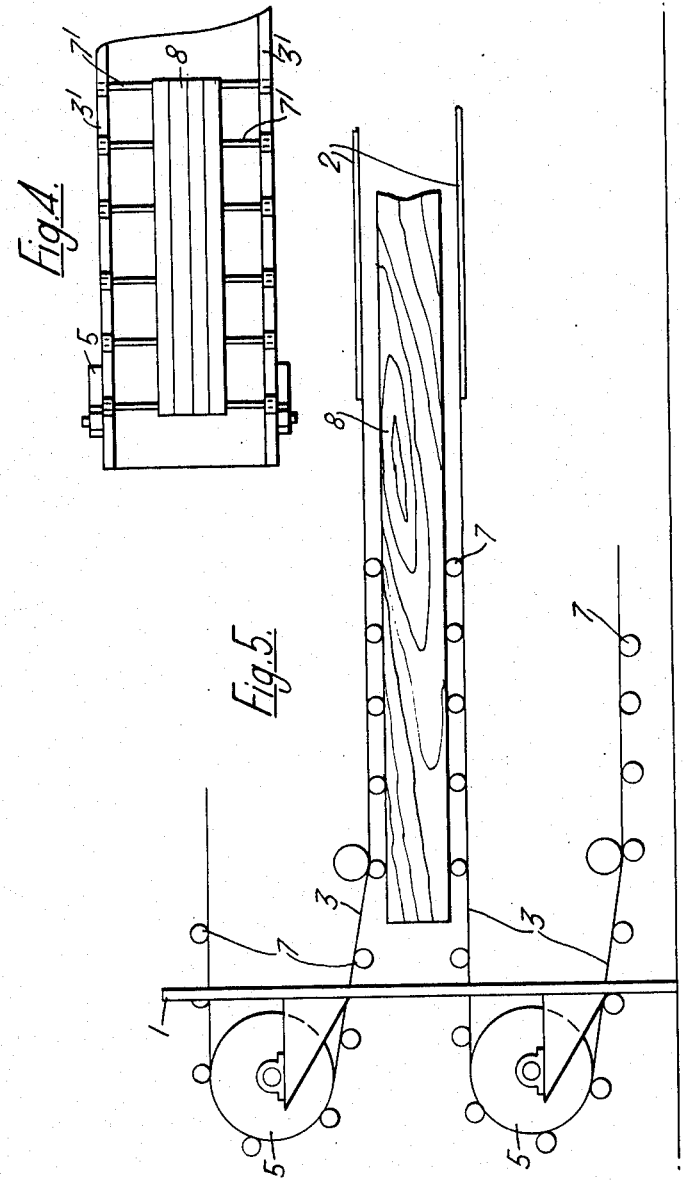

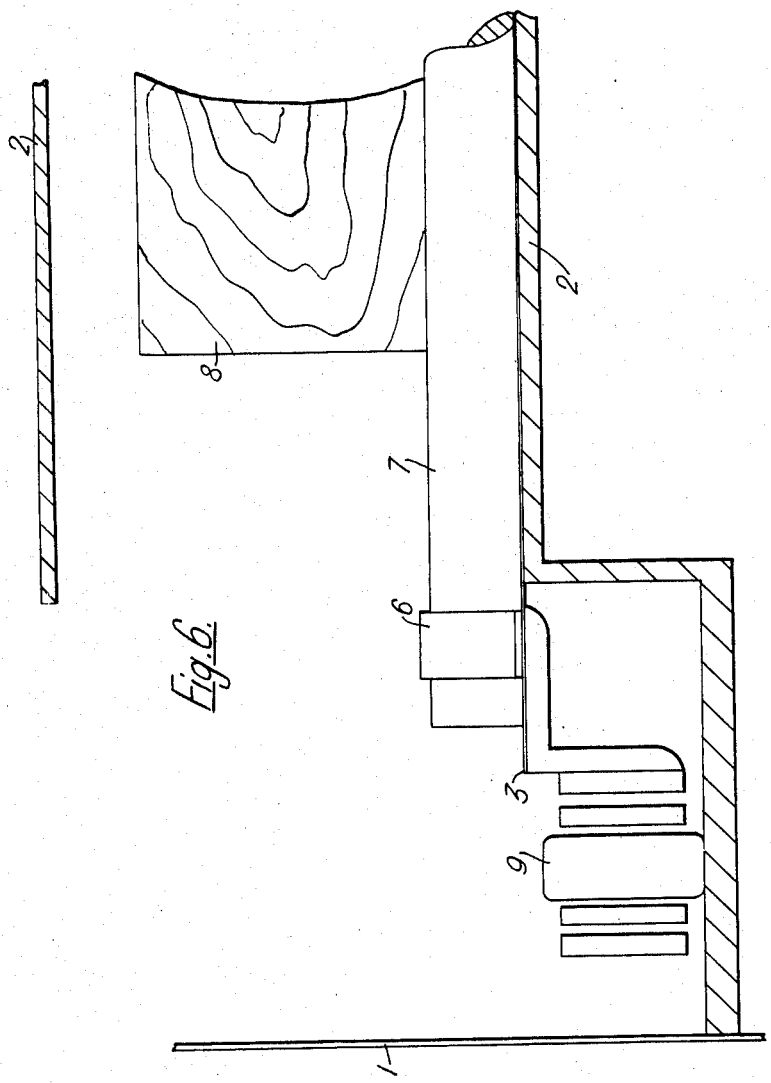

3,256,416
RADIO-FREQUENCY DIELECTRIC OVENS
Edmund Murphy, 14 Granard Ave., Putney,
London, SW. 15, England
Filed June 6, 1963, Ser. No. 286,092
Claims priority, application Great Britain, June 15, 1962,
23,020/62
2 Claims. (Cl. 219—10.69)

The invention relates to an oven for heating materials by high frequency dielectric heating.

In accordance with the invention such an oven has at least one pair of opposed electrodes and a platform made of glass for supporting the material to be heated and mounted between the electrodes. Preferably the platform is movable and is one run of a conveyor belt.

In one form the platform or conveyor belt is made from spun glass or glass fibre. In an alternative form the platform or conveyor belt comprises a belt made from spun glass with pockets to accommodate parallel glass or other rods spaced parallel to one another across the belt so as to space the belt from the electrodes. Alternatively the platform or conveyor belt may comprise a ladder like structure of glass or other rods supported at their ends by continuous bands or ropes of spun glass or glass fibre.

The advantage of using a support platform or conveyor belt of glass is that the glass is not heated by high frequency and does not give rise to dielectric losses, is not readily fusible by contact with heated articles and is generally nonreactive and does not impart taste or odour to the products.

An oven according to the invention is particularly suitable for the accelerated seasoning of timber by radio frequency dielectric heating. Other uses may be made of ovens constructed in the course of the invention, however, such as cooking for biscuits, rusks and the like or the drying in transit of products such as foundry cores.

Several forms of the oven according to the invention for drying timber planks are illustrated in the accompanying drawings in which:

FIGURE 1 is a general arrangement of the kiln or oven looked at from above;

FIGURE 2 is a sectional side elevation of an oven similar to that shown in FIGURE 1 but having spacers partly carried in pockets in a conveyor belt and partly hand inserted between superposed planks of timber.

FIGURES 3(a) and (b) are sections at right angles showing details of a part of the conveyor belt shown in FIGURE 2.

FIGURE 4 is an alternative form of conveyor belt having an open ladder like construction;

FIGURE 5 is a sectional side elevation of part of an oven having two conveyor belts similar to those shown in FIGURE 2 and:

FIGURE 6 is a sectional end elevation of part of a furnace showing an alternative drive for the conveyor belt.

Referring to FIGURE 1 the oven comprises a boxed in structure 1 containing radio frequency dielectric heating electrodes 2 spaced apart in pairs only the top ones being shown and two conveyor belts 3, the upper run of which passes between the electrodes. On the conveyor belts are stacks of planks 4, spacers if desired being inserted between the planks. The run of the conveyor belts 3 is from left to right, untreated timber being stacked at the end of the belts outside the oven at the inlet end and heated treated timber being removed from the right hand end of the belts after they leave the oven. The conveyor belts shown are driven by passing over rollers 5 and are constructed of a woven fabric of spun glass or glass fibre.

In the form shown in FIGURE 2 and illustrated in more detail in FIGURES 3(a) and (b) the belt 3 is formed of woven fabric of spun glass or glass fibre and is turned over at each edge to form a pocket 6 for a spacer 7 which is a glass rod which may be formed of solid glass or glass fibre, spun glass or other material. The belt 3 is fitted round the rollers 5 so that the spacers 7 hold the runs of the belt away from the electrodes 2. Further spacers 8 are laid between each pair of boards, so as to preserve a ventilation space between adjacent boards in a stack.

In the arrangement shown in FIGURE 4 the conveyor belt 2 comprises a loadder-like structure formed of glass or other rods 7' which are spaced apart and are carried at the ends by two bands or ropes 3' of glass fibre or spun glass.

In the arrangement shown in FIGURE 5 each belt 3 may conveniently have the form illustrated in FIGURES 3a and 3b and two such belts are provided each being driven by separate drums 5. The upper run of the lower belt passes above the bottom electrode and the lower run of the upper belt passing below the upper electrode. In this way timber 8 is carried between two belts through the oven being spaced away from the electrodes by the spacers. The arrangement shown in FIGURE 6 utilises a belt 3 woven from spun glass or glass fibre and having pocketed spacers 7 as shown in FIGURES 3(a) and (b) but is applicable to any of the forms of belt shown in the preceding figures. The belt 3 is driven not by passing over drums as in the preceding figures but by being attached at each edge to a projection from a roller chain 9 which is driven by sprockets (not shown).

I claim:

1. An oven for heating materials by radio frequency dielectric heating, comprising spaced electrodes and a flexible conveyor belt passing between the electrodes, said conveyor belt being composed essentially of glass, said conveyor belt comprising a flexible web of glass fibres having pockets therein, and solid glass rods positioned in said pockets, the said rods being spaced apart and extending transversely of the web.

2. An oven for heating materials by radio frequency dielectric heating, comprising spaced electrodes and a flexible conveyor belt passing between the electrodes, said conveyor belt being composed essentially of glass, said conveyor belt comprising continuous parallel webs of glass fibres and glass rods supported at their ends by said parallel webs and forming therewith a ladder-like structure.

References Cited by the Examiner
UNITED STATES PATENTS

| | | | |
|---|---|---|---|
| 2,360,257 | 10/1944 | Muller et al. | |
| 2,423,902 | 7/1947 | Peterson | 219—10.69 |
| 2,530,680 | 11/1950 | Burkholder | 219—10.69 |
| 2,877,888 | 3/1959 | Wittenberger | 198—195 |
| 2,906,395 | 9/1959 | Greer | 198—195 |
| 2,986,387 | 5/1961 | Illing | 198—189 |
| 2,998,501 | 8/1961 | Edberg et al. | 219—10.69 |
| 3,017,014 | 1/1962 | Cumming | 198—193 |

ANTHONY BARTIS, *Acting Primary Examiner.*

RICHARD M. WOOD, *Examiner.*

L. H. BENDER, *Assistant Examiner.*